United States Patent
Pearson

[15] 3,703,915
[45] Nov. 28, 1972

[54] THIN KERF SAW MACHINERY
[72] Inventor: Harry C. Pearson, Beaverton, Oreg.
[73] Assignee: Portland Iron Works, Portland, Oreg.
[22] Filed: Aug. 14, 1970
[21] Appl. No.: 63,862

[52] U.S. Cl. .................83/824, 83/169, 83/676
[51] Int. Cl. .............................B27b 5/34
[58] Field of Search......143/37, 56, 160, 160 H, 164, 143/157 C, 157 G, 158; 83/201.15, 169, 676; 308/DIG. 1

[56] References Cited

UNITED STATES PATENTS

| 113,698 | 4/1871 | Sherman et al..............143/56 |
| 995,991 | 6/1911 | Trout........................143/37 R |
| 3,202,189 | 8/1965 | Pearson ....................143/37 R |
| 3,479,097 | 11/1969 | McLauchlan et al....................83/201.15 X |
| 3,593,763 | 7/1971 | Neild..................83/201.15 X |
| 843,336 | 2/1907 | Garland.................143/160 R |
| 3,540,334 | 11/1970 | McLauchlan............83/169 X |
| 3,465,794 | 9/1969 | McLauchlan et al.................83/201.15 X |

Primary Examiner—Andrew R. Juhasz
Assistant Examiner—James F. Coan
Attorney—Kolisch & Hartwell

[57] ABSTRACT

Thin kerf saw machinery including a saw arbor mounted for rotation above a set of power rollers adapted to transport lumber past the arbor for cutting. A plurality of saw collars are arranged on the arbor in side-by-side relationship, each collar being suspended for free lateral movement along the arbor and adapted to be rotated therewith. Each saw collar supports a circular saw blade fabricated of relatively thin gauge metal for thin kerf sawing. Saw guides are provided for each blade, being retained in control arms positioned adjacent the blades. The saw guides are adapted to exert selective forces on the sides of the saw blades near the gullet line of the blades for independently controlling the position of each blade as it enters the lumber. Each saw guide comprises at least a pair of control pads secured in opposed relationship, one on each side of a corresponding saw blade. The head surfaces of the pads are recessed to form fluid-retaining cups which confine a lubricating cushion of fluid adjacent the sides of the saw blades, when rotating. Fluid for filling the lubrication cups and operating the control pads is furnished from a remote source through a network of internal channels in the control arms. In one preferred arrangement, two sets of saw guides are used on each blade, the sets being separated between 60° and 120° along the outer periphery of the blade.

14 Claims, 6 Drawing Figures

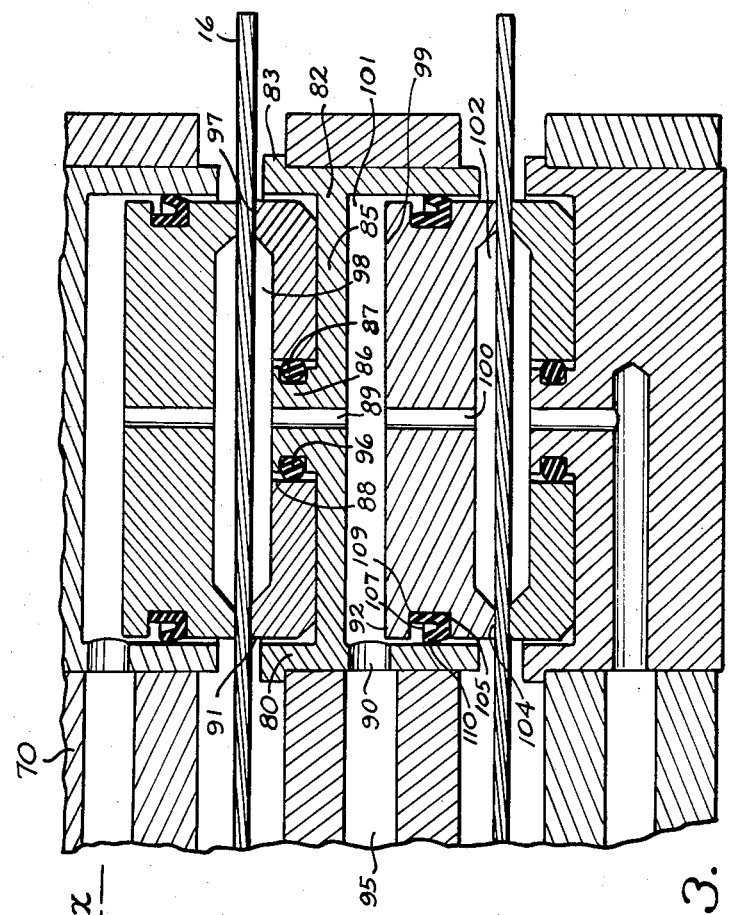
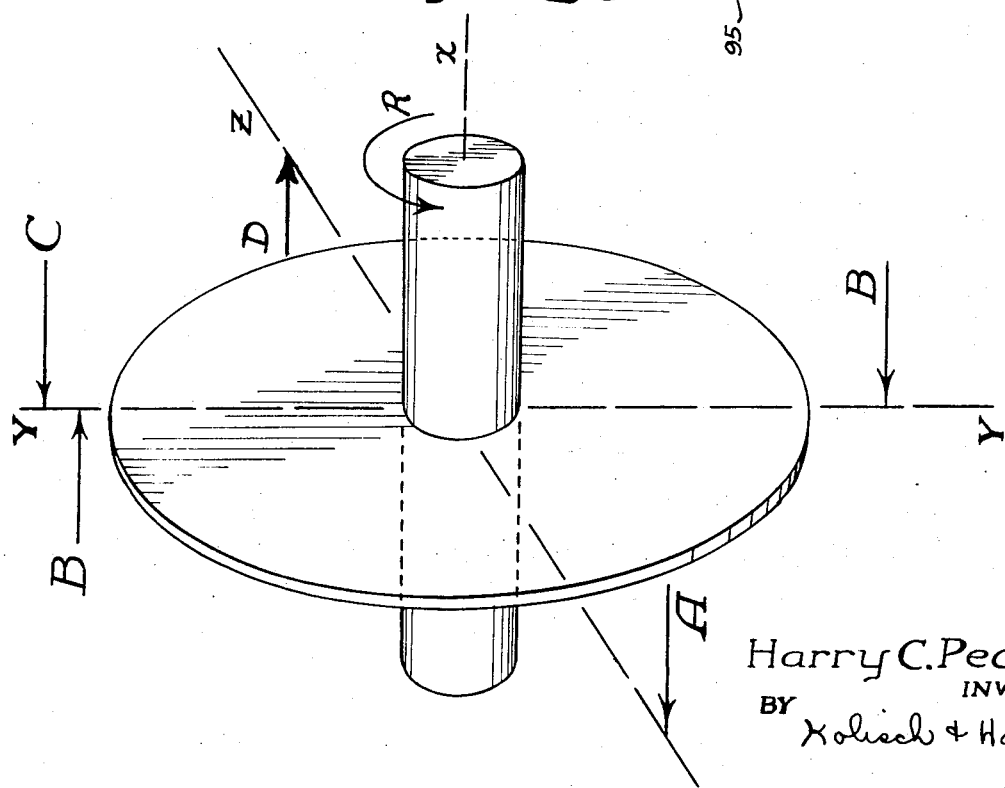
Fig. 3.
Fig. 6.
Harry C. Pearson
INVENTOR
BY Xolisch & Hartwell
Attys.

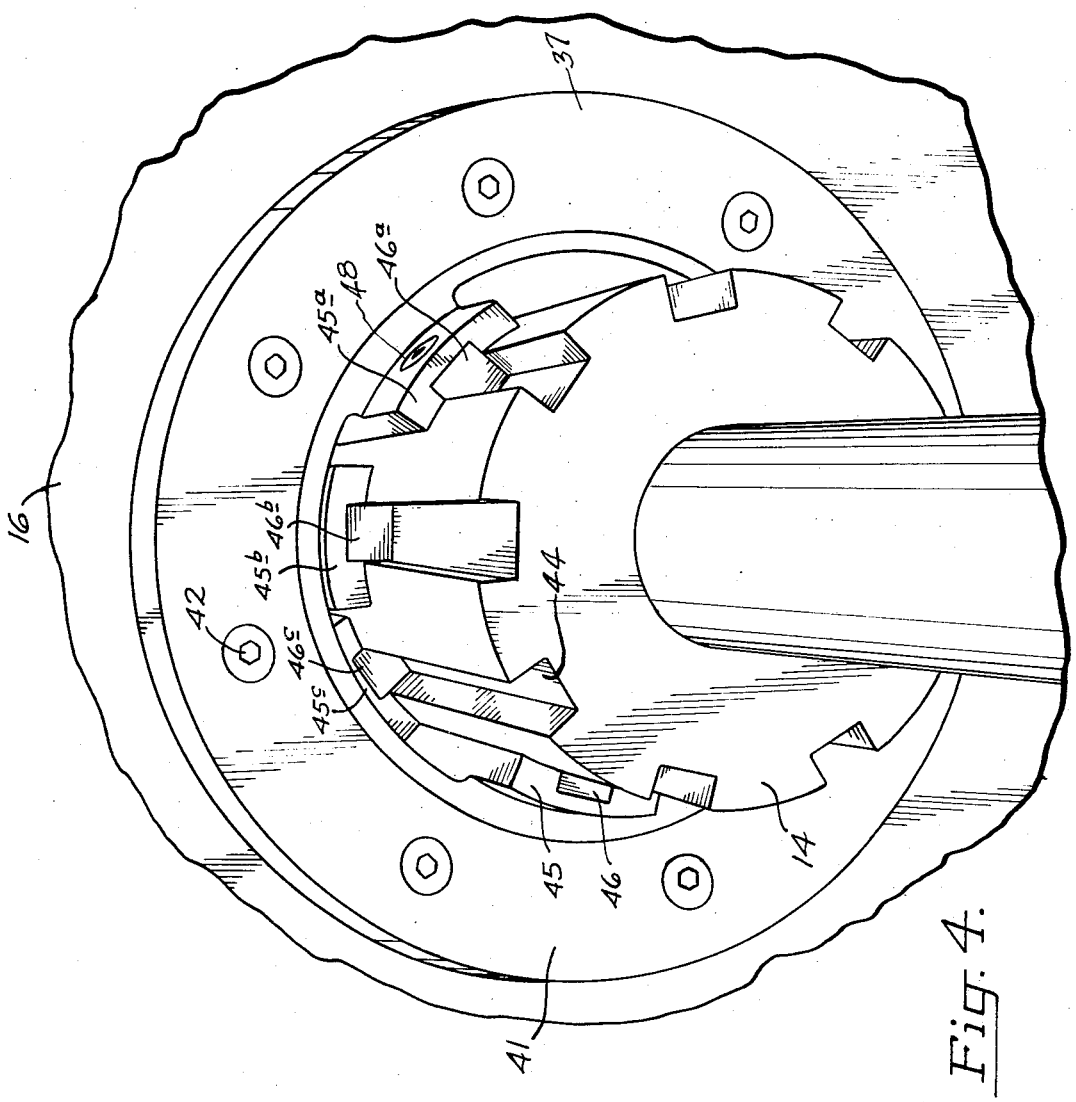
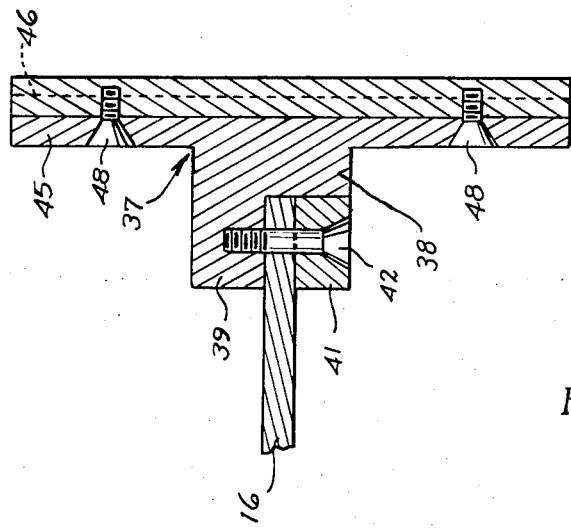
Fig. 4.
Fig. 5
Harry C. Pearson
INVENTOR
BY Kolisch & Hartwell
Attys.

THIN KERF SAW MACHINERY

BACKGROUND OF THE INVENTION

The present invention relates to saw machinery especially designed for use in the lumber industry. More particularly, the invention relates to machinery for precisely controlling the cutting path of a saw blade adapted for cutting a thin kerf.

Conventional saw machines used in the lumber industry, and particularly high production machines adapted for making battery cuts of moving cants or flitches, are equipped with saw blades formed of heavy gauge metal and, therefore, are adapted to cut wide kerfs. These machines usually include a plurality of circular saw blades, each blade being mounted on a separate saw collar, with the collars being suspended side-by-side upon a rotatable arbor. Various means are utilized to attain the desired spacing between blades and to control the cutting path of the respective blades. In general, however, the control systems for heavy gauge saws merely adjust the spacing between the saw collars of adjacent blades and rely upon the stiffness of the blades to maintain satisfactory alignment of the cutting path of the blades.

To further minimize deviations of the blade from the desired cutting line, the heavy gauge saw blades are usually tensioned. Tensioning of a circular saw blade is a conventional operation which consists of treating the metal of the blade so that the inner periphery of the finished blade has a residual tension greater than the outer periphery of the blade. The purpose of tensioning the blade is to compensate for the effect of centrifugal force when the blade is rotating. Without tensioning, the outer periphery of the blade has a tendency to increase in circumference when rotating. Such "loose" blades tend to snake when cutting.

In view of the rising cost of wood in recent years, attempts have been made to replace heavy gauge saws with thin saws to reduce kerf wastage and increase the amount of usable lumber which can be obtained from a given log. Furthermore, saw arrangements have been designed for more accurately controlling the cutting line of the saw blades so that rough cuts of lumber can be made closer to the desired size of the finished lumber. This eliminates other wastage in the cutting of a given log.

Some of the thin kerf saw arrangements utilize multiple band saws arranged for battery cutting. However, such systems are generally slow and not practical for use in our domestic lumber industry.

Other thin kerf sawing arrangements, utilizing setups of thin circular saw blades, can be generally characterized as including saw collars designed to float in gang fashion on the rotating saw arbor. The systems utilize control pads which contact the saw blades near the outer periphery of the blades. The control pads must be placed in that position due to a lack of stiffness in the thin saw blades, and due to a difficulty in properly tensioning the thinner blades.

One sawing arrangement utilizing thin kerf circular blades is described in U. S. Pat. No. 3,285,302 to Thrasher which is an improvement over the thick kerf saw arrangements previously used in the lumber industry. However, certain undesirable features are present in the Thrasher system. In particular, the system discloses the use of blade contacting control pads which are subject to wear and which result in heating of the saw blades. In addition, the saw arbor and contact pads of Thrasher are arranged below the work piece. Consequently, the blade control system is constantly showered with saw dust and other debris and is subject to excessive fouling.

Furthermore, the Thrasher system uses only a single reference point for saw blade control, i.e., at the first saw line. The cutting lines of the other saw blades are all established with respect to the next adjacent saw blade. Therefore, snaking in one saw cut can be reflected into the saw line of the adjacent saw blades.

SUMMARY OF THE INVENTION

Accordingly, it is an object of the invention to provide improved saw machinery, satisfactorily utilizing saw blades of smaller thickness than was heretofore possible.

It is another object of the invention to provide high production saw machinery for accurately making battery cuts of moving cants or flitches of lumber at increased operating speeds.

A further object is to provide saw machinery where it is not critical that saw blades used in the machinery be tensioned.

It is yet another object of the invention to provide saw machinery including saw guides that provide a fluid cushion on either side of each saw blade.

A related object is the provision of such machinery which further includes a unique fluid supply system for the saw guides.

It is a further object of the invention to provide saw blade control means wherein at least two sets of saw guides are provided for each saw blade. These are located in a predetermined position with respect to the blade to minimize the formation of standing waves in the saw blade when rotating.

It is yet a further object of the invention to provide a saw blade control system which includes one control pad for each saw blade that independently establishes a desired saw line for that blade, and includes another self-adjusting control pad for aligning the saw blade with respect to the reference point.

These and other objects of the invention are attained by saw machinery which includes a saw arbor mounted for rotation above a set of rollers adapted to transport flitches past the arbor for cutting. A plurality of saw collars are arranged on the arbor in side-by-side relationship, each collar being mounted on the arbor for free lateral movement with respect thereto. Each collar supports a circular saw blade fabricated of relatively thin gauge metal. Saw guides are provided on both sides of each saw blade, being located near the gullet line of the blade for accurately determining the cutting line of each saw blade. Each saw guide includes a pair of control pads mounted in opposed relationship to each other, one on each side of the saw blade, for controlling the position of the blade as it cuts the lumber.

The control pads are retained within cylinders formed in the ends of control or support arms suspended between the saw blades from a support shaft. Fluid for operating the control pads is supplied to the cylinders through an arrangement of internal fluid passages within the support arms. The head surface of each control pad is recessed to form a fluid-retaining cup adjacent the saw blade. An opening is provided through each control pad for delivery of fluid, under pressure, into the cup to form a fluid cushion between the control pad and the side of the saw blade. In one preferred embodiment of the saw machinery, two or more sets of saw guides are provided for each saw blade, the sets of guides being spaced-apart along the outer periphery of the saw blade at an angular distance ranging between 60° and 120°, the angular distance not being divisible by an integral number into 360°, to provide control of standing waves as well be described.

BRIEF DESCRIPTION OF THE DRAWINGS

These and other objects of the invention will become apparent from the following detailed description of the invention taken in conjunction with the accompanying drawings, wherein:

FIG. 3 is a partial sectional view, along the line 3—3 of FIG. 1 and on an enlarged scale, showing an arrangement of cylinders and control pads used in controlling multiple saw blades on an overhead arbor;

FIG. 4 is a perspective view of a saw arbor and saw collar arrangement suitable for use with the embodiment described, FIG. 5 is a sectional view through one side of the saw collar shown in FIG. 4; and FIG. 6 is a perspective simplified view of a disk which has been inserted to explain the control forces exerted on the saw blade by the control apparatus of the invention.

DETAILED DESCRIPTION OF THE INVENTION

Figure 1:
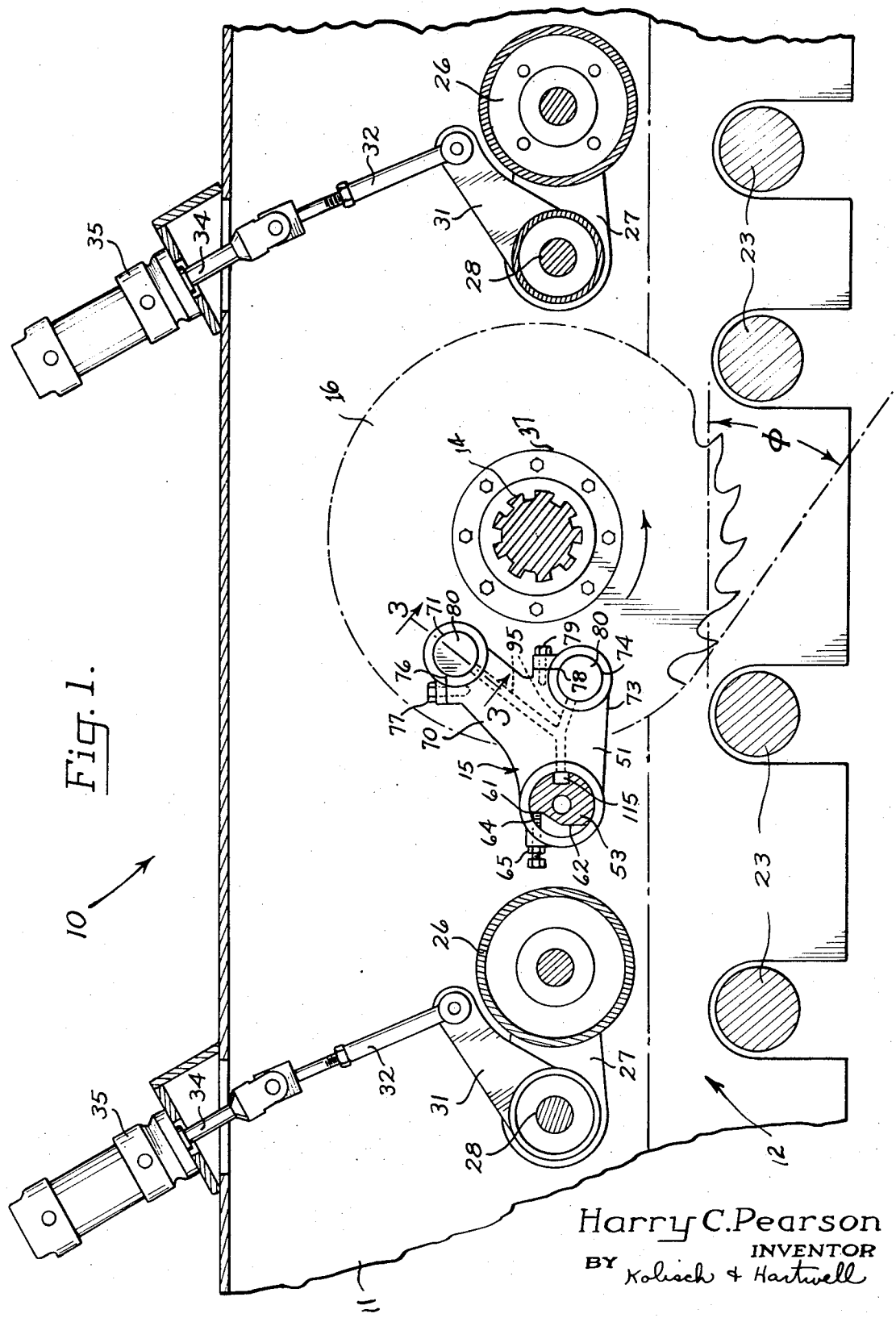
FIG. 1 is a side elevation view in section of saw machinery designed in accordance with the invention.
Figure 2:
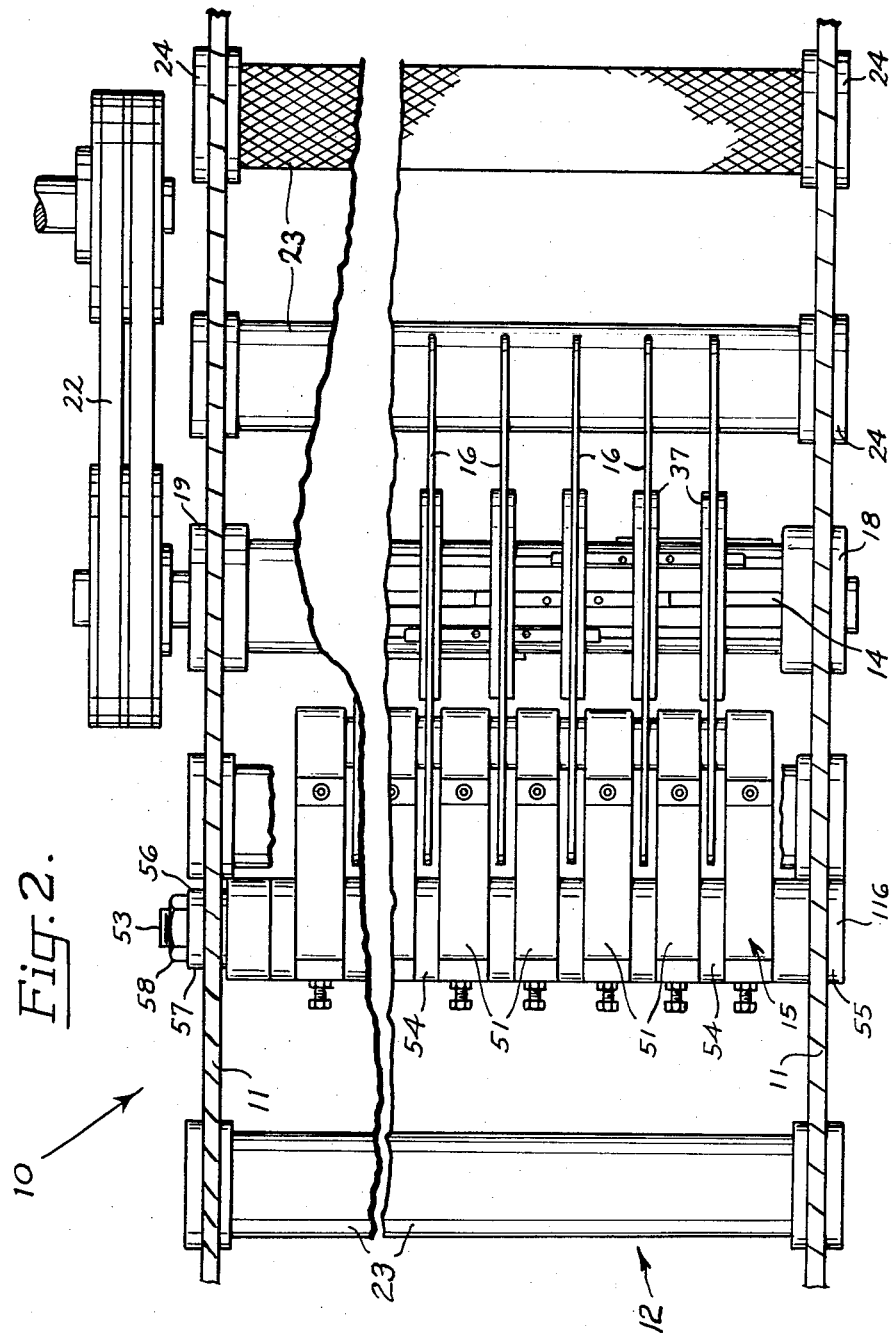
FIG. 2 is a top cross-sectional view, of the saw machinery.

Referring now to the drawings, and particularly to FIGS. 1 and 2, one embodiment of the invention is shown in the form of saw machinery 10 adapted for battery cutting of cants or flitches of lumber. Saw machinery 10 generally comprises a framework 11 from which are supported a feed roller system 12, a rotatable saw arbor 14 and a saw blade control means 15.

Saw arbor 14 is supported for rotation in bearings 18, 19 (FIG. 2) and driven by a motor, not shown, through drive belts 22. Other drive systems, such as a directly coupled motor, could, of course, be used. Movement is in a counterclockwise direction as shown in FIG. 1. A plurality of saw blades 16 are supported for rotation with the saw arbor in a manner to be explained.

The lumber feed roller system is adapted for feeding cants or flitches into the saw blades and for transferring the cut lumber away from the saw. The system generally includes a plurality of lower rollers 23 rotatably supported in bearings 24 in the framework 11. Rollers 23 are adapted to be driven by conventional means, not shown, in a clockwise direction as shown in FIG. 1 to transport flitches past the saw arbor. The feed system further includes a plurality of pressure rollers 26 supported above the feed rollers for stabilizing the cants during cutting.

As seen in FIG. 1, each roller 26 is suspended for free rotation from a pair of arms, such as arm 27, journaled at the ends of the roller. Arms 27 are fixedly secured at a set of their ends to a shaft 28 supported by bearings, not shown, in framework 11. Arms 31 are provided, having one end fixedly secured to the shaft 28, slightly offset from arms 27, and the other end secured to a connecting pin 32. Pin 32 is universally connected to shaft 34 of a fluid-operated ram such as a hydraulic ram 35, secured to framework 11. Ram 35 is supplied with fluid under pressure, from a source not shown, to adjust the height of rollers 26 and thereby vary pressure exerted on the workpiece. Under normal operating conditions rollers 26 are adjusted to a height which permits the weight of the rollers to ride on the flitches for stabilizing them. If desired, rollers 26 can be positively driven in synchronism with rollers 23 although this is not necessary.

Referring to FIGS. 4 and 5, each saw blade 16 is secured to arbor 14 by means of a saw collar 37. The saw blades are fabricated for cutting thin kerfs. The term thin kerf commonly might refer to kerfs of less than 0.130 inches in width. The saw collars are mounted side-by-side as shown in FIGS. 4-5. A single saw blade and saw collar will be described, it being understood that the other corresponding elements are similar thereto.

Each saw blade 16 is formed with a circular center opening of suitable size to fit snugly over a hub 38 of collar 37, in contact with the side of a lip 39 upstanding from the hub. A retaining ring 41 is provided, also having an inside diameter adapted to fit over hub portion 38. The saw blade 16 is positioned between lip 39 and retaining ring 41 and secured to the hub by screws 42, located in suitable openings in the retaining ring and saw blade and engaging threaded holes in the lip portion.

Each collar is secured to the saw arbor for rotation therewith by a three-point suspension which permits free lateral movement of the saw blade along the arbor during rotation.

Further explaining, arbor 14 is a splined shaft, having nine keyways 44 formed therein equally spaced around the periphery of the shaft. Each saw collar is joined to three elongate key-support arms 45 presented at the inner surface of the hub, spaced at 120° intervals around the periphery thereof. Each arm 45 is set transverse to the cutting plane of the saw blades and has a recessed bottom surface adapted to receive a corresponding key 46. Each key 46 is secured to its support arm by screws 48 and is adapted to fit within a corresponding keyway of the spline.

The key support arms are sufficiently long to provide good vertical stability to the saw blades. Suitable tolerance is provided between the keys and the keyways of the arbor to permit free lateral movement of the saw collars along the arbor, even when rotating.

Arms 45 are adapted to fit under the collars of adjacent saw blades in a nested configuration when the saw collars are closely spaced. To permit such nesting, the inside diameter of the hubs of the saw collars is made substantially larger than the outside diameter of the saw arbor. The nested collar arrangement is illustrated in FIG. 4 where adjacent key support arms 45a, 45b and 45c are shown, each being associated with a different saw collar and blade.

The nested saw collar configuration is advantageous in that it enables close positioning of the saw blade for cutting thin strips of lumber, while providing good vertical stability of the individual saw blades.

The position of each of the saw blades along a desired saw line is established and maintained by a novel control system particularly illustrated in FIGS. 1-3. The control system includes means for independently controlling the saw line of each saw blade by exerting necessary control forces on the blade just before it enters the workpiece. The method of control, explained in detail hereinafter, is a significant improvement over the prior art.

While machinery has been described with a control system for nonshiftable saws, obviously a similar control system could be used with adjustable saws.

Referring now to FIG. 2, a plurality of control arms 51 are shown, the arms also being referred to herein as support arms, each saw blade being located between two control arms. The control arms are supported in side-by-side relationship on a shaft 53 extending between the sides of framework 11. Predetermined lateral spacing of arms 51 on shaft 53 is established by spacer rings 54 between the control arms. Shaft 53 is fixedly secured to the framework 11, being attached on one end to a sleeve 55 welded to the framework 11 and being retained at the other end within a hollow collar 56 received in a corresponding hole through framework 11. The collar end of shaft 53 is formed with a threaded outer portion of reduced diameter adapted to extend through the center of collar 56 to receiver washer 57 and retaining nut 58.

With retaining nut 58 tightened on shaft 53, collar 56 exerts lateral pressure upon the contacting surfaces of arms 51 and spacer rings 54 to hold the arms firmly in position between the saw blades. However, upon loosening of nut 58, arms 51 can be pivoted upwardly to a rest position away from the saw blades. This provides sufficient clearance for any necessary maintenance of the saw blades and collars, as well as maintenance of the control means retained within the control arms.

The range of pivotal movement of the control arms, when free, is determined by an arrangement of reference surfaces on the shaft 53 and an adjustable stop bolt provided on each of the control arms. Referring to FIG. 1, shaft 53 is modified or recessed along its length whereby a first cam surface 61 and a second cam surface 62 offset therefrom are defined. Stop bolt 64 is adjustably retained in a threaded hole through the back of the control arm, being held in the desired position by lock nut 65. As shown, the control arms, when free, can be lowered until the end of bolt 64 contacts cam surface 61. Likewise, the control arms can be pivoted in a counterclockwise direction as viewed in FIG. 1, until bolt 64 contacts cam surface 62.

By adjusting the stop bolts associated with each control arm, the relative position of the arm and the saw arbor can be adjusted. Preferably, the lower surfaces of the control arms are located relatively close to the upper surface of the workpiece so that the saw blades are controlled at a point near their entry into the workpiece. However, to avoid damage thereto, the control arms should never be positioned lower than the bottom surface of pressure roller 26.

With the arbor overhead and the saw blades rotating in a counterclockwise direction as viewed in FIG. 1, the cutting teeth of the saw blades and the lumber are moving in the same direction, in contrast to the usual operation of circular saw blades. However, by positioning the lumber so that the saw blade extends substantially below its lower surface, and the angle of departure $\phi$ of the teeth from the lumber is 30° or greater, the tendency of the saw blades to kick the workpiece is avoided.

The location of the control arms above the workpiece, which is permitted only by the use of the overhead arbor, avoids a build-up of sawdust and other debris on the control arms and between the saw blades and the control pads. Consequently, the arrangement disclosed is a significant improvement over prior art systems which are subject to constant fouling from debris.

Saw guides are provided including control pads located on both sides of each saw blade in generally opposed relationship. Each of the control pads includes a fluid-operated control head adapted to fit closely against the saw blade when the blade is at rest. With the blades rotating the control pads are operated, under a unique fluid pressure system, to exert control forces on the saw blades. The control pads are retained within cylindrical bores formed in the ends of the control arms; and fluid to actuate the control pads is supplied through a unique arrangement of internal channels formed in shaft 53 and the control arms. The blade influencing heads of the control pads are recessed to form fluid-retaining cups adjacent the saw blades.

Upon activation of the control system, fluid is supplied to the cups under pressure to form a fluid bearing between each pad and its corresponding saw blade. The fluid bearing acts to lubricate the saw blade, when rotating, and to prevent wear of the control pad. However, the fluid bearing is sufficiently thin that effective control forces can be exerted upon the sides of the saw blades by the pads to maintain accurate alignment of the saw blade even when cutting through knots or other obstructions in the lumber.

Referring now to FIGS. 1, 2 and 3, one preferred arrangement of saw guides is explained in detail. With the exception of the control arms at the ends of the saw arbor, identical saw guides are confined within each of the control arms. Consequently, only a single control arm will be explained, it being understood that the other corresponding control arms are identical thereto. The control arms and associated saw guides at the ends of the arbor are separately described.

Each control arm includes an upper portion 70 (FIG. 1), having an upper cylindrical bore 71 formed therein, and a lower portion 73 having a lower cylindrical bore 74 formed therein. An expansion slot 76 is provided in the periphery of the upper portion to facilitate the installation of a sleeve 80 in bore 71. A capscrew 77 is provided in the upper portion, secured in a threaded hole extending through the expansion slot for firmly holding sleeve 80 within the opening. In similar fashion, expansion slot 78 and capscrew 79 are provided in the lower portion of the control arm for the installation and retention of an identical sleeve 80 within the opening 74.

Referring now to FIG. 3, the sleeve 80 in each cylindrical bore includes a ring portion 82 forming an inner wall or lining for the cylinder. A flange or lip 83 is attached to one edge of the ring portion, having a diameter greater than the ring portion for engaging the surface of the control arm around the periphery of bore 71. A dividing wall 85 extends across the sleeve, separating the latter into upper and lower chambers as viewed in FIG. 3. A raised annular plug 86 is formed in the center of the dividing wall on the lip side, having an annular groove 87 which extends around the periphery of the plug. A small hole 89 is formed through the center of wall 85 and plug 86 to admit fluid therethrough. Another small hole 90 is formed in the periphery of the ring portion of the sleeve for admitting fluid into the interior of the sleeve from a fluid channel 95 within the control arm.

A fixed control pad 91 is retained within sleeve 80 on the lip side of wall 85, and a self-adjusting control pad 92 is retained within the sleeve on the other side of the wall. Both control pads are formed of a relatively soft material, such as nylon, soft metal, or other suitable material. The control pads are of modified disk shape and have a diameter slightly less than the inside diameter of the ring of sleeve 80.

Pad 91 is formed with a circular opening 88 in the center thereof, adapted to fit over the periphery of plug 86 for mounting of the pad. A round sealing ring 96, formed of rubber or composition, is provided between the pad and plug 86, seated in groove 87. The outer face or head 97 of the control pad is formed with a recessed portion 98 in the center thereof forming a fluid-retaining cup when the pad contacts the side of the saw blade. When the saw blade is rotating the slight leakage of fluid from the cup serves to lubricate the saw blade.

Control pad 92 is movably retained within the sleeve and defines an extensible fluid chamber 101 between wall 85 and the back surface 99 of the pad. A relatively small hole, 100 is formed through the center of pad 92 to permit flow of fluid from chamber 101 to a recessed fluid-retaining cup 102 formed in the front face or head 104 of the pad. A seal-retaining groove 105 is formed around the outer periphery of pad 92 and a collapsible sealing ring 107 is retained therein to maintain fluid pressure within chamber 101.

Sealing ring 107 includes a base portion 109 and a lip 110 attached to one edge of the base portion. When fluid pressure is exerted from above the seal, lip 110 is forced into sealing engagement with the surface of ring 80. However, upon release of fluid pressure, lip 110 can be forced back into the groove so that pad 92 is free from contact with the saw blade. This enables the control arms to be easily removed from between the saw blades for servicing of the saw machinery.

Referring now to FIG. 1, fluid channels 95 in the control arm are connected with a groove 115 formed in the length of shaft 53. The groove in shaft 53 is located to communicate with channels 95 when the control arms are lowered into a control position. However, when the control arms are raised, such communication is interrupted. Groove 115 receives fluid from a reservoir through a fluid line, not shown, which is connected to the groove at the end of the support shaft.

The control arms located at the ends of the arbor each include only one control pad; with the control arm at one end of the arbor being provided with a fixed control pad 91 and the control arm at the opposite end of the arbor being provided with a self-adjusting control pad 92.

It should be apparent that each of the fixed control pads 91 establishes an independent reference point or cutting line for the saw blade associated therewith, as determined by the positioning of the control arms on shaft 53.

Without fluid pressure in channels 95 and chambers 101, the control pads may rest in contact with the saw blades. However, when the saws are to be operated, fluid under pressure is supplied to the chambers, and through holes 89, 100 to the fluid retaining cups in the faces of the control pads.

Holes 89, 100 are of suitable diameter to permit a build-up of pressure in the cups sufficient to force the self-adjusting control pad a slight distance away from the saw blade, whereby a lubricating cushion of fluid is maintained on each side of the blade. This prevents excessive wear of the control pads. However, due to the difference in the fluid contacting area between the front of the control pad 92 and the rear of the control pad, a force is exerted by pad 92 that maintains the saw blade against the fluid bearing of pad 91 and in alignment with the desired cutting line. Should the blade strike a foreign object or knot in the lumber, any tendency of the blade to deviate from the cutting line is minimized by the forces exerted on the sides of the saw blade by the control pads.

While a single set of saw guides located near the gullet line of the saw blade produces an operable result, it is preferred that multiple sets of saw guides be utilized for control purposes. In the embodiment shown, two sets of saw guides are provided, being mounted on a single control arm. This arrangement is advantageous since the upper and lower saw guides are maintained in good alignment even if the saw guides are pivoted away from the saw blade for maintenance and then returned. Furthermore, the radial spacing of the respective sets of saw guides is maintained. The sets of saw guides are illustrated spaced-apart near the gullet line of the rotating blade at an angular distance of approximately 66°. During experimental usage, this has been found to be a particularly effective control arrangement.

It is believed that the advantages which result from the use of multiple sets of saw guides can best be explained, theoretically, by comparing the motion of a rotating circular saw blade, supported as in the present saw machinery, to the gyroscopic motion exhibited by a similarly suspended rotating disk.

Referring particularly to FIG. 6, a disk is illustrated supported upon a shaft, rotating in the direction indicated by the arrow R. With the disk rotating, it is known that a force exerted moving the front edge of the disk to the left, as represented by the arrow A, will create a reaction force upon the disk, represented by the arrow B, causing the top of the disk to move to the right. Similarly, a force exerted moving the front edge of the disk to the right, will create a reaction force upon the disk causing the top of the disk to move to the left.

In view of the above, it should be apparent that the use of a single set of saw guides, located at the front of a circular saw blade, would not result in the best possible control of the saw blade. Thus, any force exerted upon the front of the blade to correct a deviation from the cutting line would cause the top of the saw blade to tilt in the direction of the deviation. Therefore, in order to control the deviation of the saw blade, it would be necessary to overcome both the force causing the original deviation of the saw blade and the reaction force on the blade caused by the corrective force of the saw guide.

However, referring again to FIG. 6, it is known that a force moving the top of the disk to the left, as represented by the arrow C, will create a reaction force upon the disk, represented by the arrow D, causing the back of the disk to move to the right and the front of the disk to move to the left. In similar fashion, a force moving the top of the disk to the right, will create an opposite reaction force upon the disk.

Accordingly, a second set of saw guides located at or near the top of the saw blade can be used effectively to overcome the reaction forces upon the blade that result from the saw guides at the front of the blade. For example, assuming that the front of the saw blade deviates from the cutting line to the right, it is then necessary for the control pad at the front of the blade to exert a corrective force moving the front of the saw blade back to the left. This corrective force causes a reaction force, tending to tilt the saw blade to the right. However, if a second set of saw guides is used at the top of the saw blade, a second corrective force is applied to the top of the blade, preventing the tilt. At the same time, the reaction force resulting from the second corrective force causes the front of the saw blade to move to the left, in the desired direction to correct the original deviation of the blade. Furthermore, the magnitude of the corrective force applied at the top of the blade is equal to the reaction force tending to tilt the blade. Accordingly, the second set of saw guides serves to compensate for any reaction force on the saw blade that occurs due to the saw guides at the front of the blade.

For ideal compensation, the second set of saw guides should be spaced at an angular distance of 90° from the first set of saw guides. However, it has been observed that spacing of the saw guides in that position permits what I will refer to as standing waves to occur in the rotating saw blade. The phenomena resulting in the build-up of standing waves in solid bodies due to vibration are well-known. In the particular case of a rotating saw blade, it has been observed that with multiple sets of saw guides angularly spaced along the saw blade at intervals of 60° or 90°, the build-up of standing waves is pronounced. The presence of such standing waves is exhibited in the form of a distortion or bending of the edge of the saw blade transverse to the cutting line. The maximum distortion of the saw blade occurs midway between the saw guides and results in a blade distortion commonly known in the lumber industry as "blade snaking."

It has been found that the occurrence of standing waves in a rotating saw blade can be eliminated by using multiple sets of saw guides located at angular spacings that are not divisible by an integral number into 360°. In particular, angular spacings of 60° and 90° should be avoided. During experimental operations, it has been observed that the use of multiple sets of saw guides angularly spaced along the saw blade by distances falling between 66° and 82° prevents the occurrence of standing waves and adequately compensates for the reaction forces that occur on the saw blade.

It is claimed and desired to secure by Letters Patent:

1. Saw machinery including a saw arbor adapted for rotation and a circular saw blade mounted on the arbor, and guide means for controlling the cutting line of the saw blade, said guide means comprising first and second control pads, each of said control pads having a head for exerting control force upon the saw blade, said head having a recessed portion for confining fluid to provide a fluid film between the head and the saw blade when rotating, means for supporting said first control pad with the head thereof adjacent one side of said saw blade proximate the gullet line of said blade, said means comprising a support arm having said first control pad mounted thereon with the pad fixedly located with respect to said support arm at a reference point that establishes the cutting line of the saw blade, means for supporting said second control pad with the head thereof adjacent the other side of said saw blade opposite said first control pad proximate the gullet line of said blade, said means comprising another support arm having means defining a cylindrical bore, said second control pad being mounted for reciprocal movement within said bore with such reciprocal movement changing the position of the head of said second control pad with respect to the head of said first control pad, means for moving at least said second control pad with respect to the associated support means, and means for supplying fluid to the recessed portions of the heads of the control pads.

2. Saw machinery as claimed in claim 1, wherein a seal is provided between the second control pad and the cylindrical bore said second control pad and said bore define an internal chamber within said other support arm, and wherein means is provided for supplying fluid to said chamber whereby a pressure of fluid is maintained within said chamber.

3. Saw machinery as claimed in claim 2, wherein said second control pad is formed with a groove about the periphery thereof, and said seal includes an annular base member fitting closely within the groove and an annular lip flexibly secured to an edge of said base member forming a releasable pressure seal between said control pad and said cylindrical bore maintaining fluid under pressure within said chamber.

4. Saw machinery as claimed in claim 1, wherein said support arms are formed with internal channels therein, and the means for supplying fluid to the recessed portions of the heads of the control pads comprises means in the control pads connecting their recessed portions with the internal channels formed in their respective support arms.

5. Saw machinery including first and second spaced circular saw blades, an elongate support arm having a cylindrical bore formed through one end of said arm and an internal channel formed within said arm communicating with said bore, means mounting said arm on said saw machinery with its said one end disposed between said first and second saw blades, a cylindrical sleeve retained within said bore including a wall dividing said sleeve into first and second chambers opening, respectively, toward said first and second saw blades, said sleeve having an opening formed therein adapted to communicate with said internal channel, a first control pad mounted within said first chamber adapted to exert control force upon said first saw blade, and a second control pad mounted within said second chamber adapted to exert control force upon said second saw blade.

6. Saw machinery as claimed in claim 5, wherein said first control pad is retained at a fixed location within said first chamber to define a cutting line for said first saw blade, and said second control pad is reciprocably retained within said second chamber for providing control force to said second saw blade in response to fluid pressure within said second chamber.

7. Saw machinery as claimed in claim 6, wherein said second control pad is formed with a groove about the outer periphery thereof, a seal member is mounted within said groove including an annular base fitting closely within said groove and an annular lip flexibly secured to said base forming a releasable pressure seal between said control pad and said sleeve.

8. Saw machinery as claimed in claim 5 further including means for supplying fluid from said internal channel to form a fluid film between each control pad and its associated saw blade.

9. Saw machinery comprising a framework, an elongate saw arbor rotatably supported on said framework having at least one circular saw blade mounted thereon, a support arm disposed on one side of the saw blade and a first control pad mounted on and fixedly located with respect to said support arm at a reference point that establishes the cutting line of the saw blade, another support arm disposed on the opposite side of the saw blade and a second control pad mounted on said other support arm disposed opposite said first control pad, the mounting for said second control pad on said other support arm accommodating reciprocal movement of the control pad with respect to said other support arm in a direction substantially normal to the plane of the saw blade and including an expansible fluid-retaining chamber behind the control pad which expands with movement of the control pad toward the saw blade, and means for admitting fluid under pressure to said expansible chamber.

10. The apparatus of claim 9, wherein said second control pad has a recessed head facing the saw blade for confining fluid to provide a fluid film between the head and saw blade, and said pad has a passage therein connecting said expansible chamber and the recess of the head for supplying fluid from said chamber to the recess of said head.

11. Saw machinery including first and second laterally spaced circular saw blades, an elongate support arm supported on said saw machinery with an end portion thereof located between said saw blades, means at said end portion of said arm defining one chamber facing one of said saw blades and another oppositely facing chamber facing the other of said saw blades, a first control pad mounted within said one chamber exerting a control force on said first saw blade, a second control pad mounted within said other chamber exerting a control force on said second saw blade, said first control pad being retained at a fixed location within said first chamber to define a cutting line for said first saw blade and said second control pad being reciprocably retained within said second chamber for providing a yieldable control force to said second saw blade.

12. The saw machinery of claim 11, wherein said support arm has a channel defined therein adapted to be connected to a supply of fluid under pressure, and wherein means connects said channel to said other chamber to admit fluid under pressure into said other chamber with said fluid exerting a pressure on said second control pad.

13. The saw machinery of claim 12, wherein each control pad has a recessed head for confining fluid, to provide a fluid film between the head and the saw blade that the pad containing the head controls, and wherein each pad includes means connecting the channel defined in said arm with the recessed head of the pad.

14. Saw machinery including a saw arbor and a saw blade mounted on said arbor, an elongate support arm mounted in said machinery having an end adjacent said saw blade and means at said end of said support arm defining a chamber facing said saw blade, a control pad reciprocably mounted within said chamber for exerting a controlling force on the saw blade, the reciprocal movement being normal to the plane of the blade, said pad having a recessed head on a side thereof facing the saw blade for confining fluid to provide a fluid film between the head and the saw blade when the saw blade is rotating, a passage in said control pad connecting the recessed head with said chamber in a region of the chamber located on the opposite side of the pad from said head, and means for introducing fluid under pressure to said region of said chamber to produce a pressure fluid against said pad urging the same against said saw blade and also to introduce fluid to the recess of said head through said passage in the control pad.

* * * * *